United States Patent [19]
Sutton

[11] Patent Number: 5,215,198
[45] Date of Patent: Jun. 1, 1993

[54] DISK HOLDER

[76] Inventor: Gerald V. Sutton, 34 Coastal Dr., Willis, Tex. 77378

[21] Appl. No.: 872,540

[22] Filed: Apr. 23, 1992

[51] Int. Cl.$^5$ .............................................. A47F 5/00
[52] U.S. Cl. ...................................... 211/40; 211/41; 206/425
[58] Field of Search ...................... 211/40, 41; 206/425

[56] References Cited
U.S. PATENT DOCUMENTS 4,629,067 12/1986 Pavlik et al. .................. 211/40 X
4,657,146 4/1987 Walters ......................... 211/40 X
4,712,679 12/1987 Lowe ............................ 211/40 X Primary Examiner—Robert W. Gibson, Jr.
Attorney, Agent, or Firm—Pravel, Hewitt, Kimball & Krieger

[57] ABSTRACT

A disk holder which comprises a generally rectangular block of wood or other material having a plurality of parallel dovetail grooves for storing disks. The dovetail grooves enable a user to easily view and flip the various disks back and forth to find the desired disk. Also, the dovetail grooves are such that the disks do not easily come out of the grooves while a user is flipping through the disks.

7 Claims, 2 Drawing Sheets

DISK HOLDER

FIELD OF THE INVENTION

The present invention relates to disk holders, and more specifically to a holder having a plurality of parallel dovetail grooves for holding computer disks, compact discs, and the like.

DESCRIPTION OF THE RELATED ART

Various types of disk organizers or disk holders are known in the art. The present invention is directed to computer disks, preferably the 3½ inch disk, although the invention can also be used with various other disks, including, but not limited to 5¼ inch floppy disks and audio compact discs.

Some disk holders are most suitable for compact storage of the disks and thus comprise box-like structures with a hinged-type of lid which stores the disks in a substantially dust-free environment. The disks are often stored vertically adjacent one another to minimize the amount of space required for storage. Although such disk holders compactly store the disks, it is difficult to quickly and conveniently find a particular disk when needed. In addition, certain disks are oftentimes very frequently used and it is desirable to be able to quickly locate and load the disk into one's computer without having to search through several disks or boxes of disks.

A disk tray is also used for storing 3½ inch disks. For example, one type of disk tray is the Econo/Store 50 3½ inch disk filing tray produced by Fellowes Corp. in Itasca, Ill. This disk filing tray includes a plurality of dividers in a box having a hinged lid. A plurality of disks may be stored between each of the dividers. The disks must be individually flipped through to locate the desired disk one is searching for.

FIG. 1 illustrates yet another type of disk holder that has been marketed for use to store audio compact discs. As shown in FIG. 1, this disk holder includes a plurality of parallel grooves with vertical side walls and rounded bottoms. The lower edge of the encased audio compact disc is placed into a groove such that the disc stands upright at a certain angle from the plane vertical to the holder. The discs preferably lean away from the vertical plane of the holder relative to the user to provide for easy readability. In order to view a certain disk, the user flips the discs in front of the desired disc forward.

One problem with disk holders having grooves with vertical side walls and rounded bottoms is that the nature and shape of the grooves do not hold the disks very well when the disks are being flipped back and forth by a user. For example, the disks may accidently come out of the grooves as a user is flipping through the disks. In addition, the nature of the rounded bottom of the grooves is such that a disk may not be in the same position relative to other disks each time the disk is flipped back and forth, thus resulting in the user not being able to adequately view a disk in certain instances.

Therefore a new type of disk holder is desired which more firmly grasps and maintains the disks that are stored in the holder as the disks are being flipped back and forth by a user while also allowing ready access to the disks. Also, a new type of disk holder is desired wherein each disk attains one of two positions relative to other disks each time the disk is flipped back and forth while still allowing the user to see identifying information on each of the disks, thus providing for easy and consistent viewing.

SUMMARY OF THE INVENTION

The disk holder of the present invention comprises a block of wood or other material having a plurality of parallel dovetail grooves for storing disks. The dovetail grooves enable a user to easily flip the various disks back and forth to find a desired disk. The use of dovetail grooves solves the problems of the prior art in that disks do not easily come out of the grooves while a user is flipping through the disks. In addition, the disks attain the same position relative to other disks each time the disks are flipped back and forth, thus providing for easy and consistent viewing.

BRIEF DESCRIPTION OF THE DRAWINGS

The objects, advantages and features of the invention will become more apparent by reference to the drawings which are appended hereto and wherein like numerals indicate like parts and wherein an illustrated embodiment of the invention is shown, in which.

DESCRIPTION OF THE PREFERRED EMBODIMENT

Figure 1:
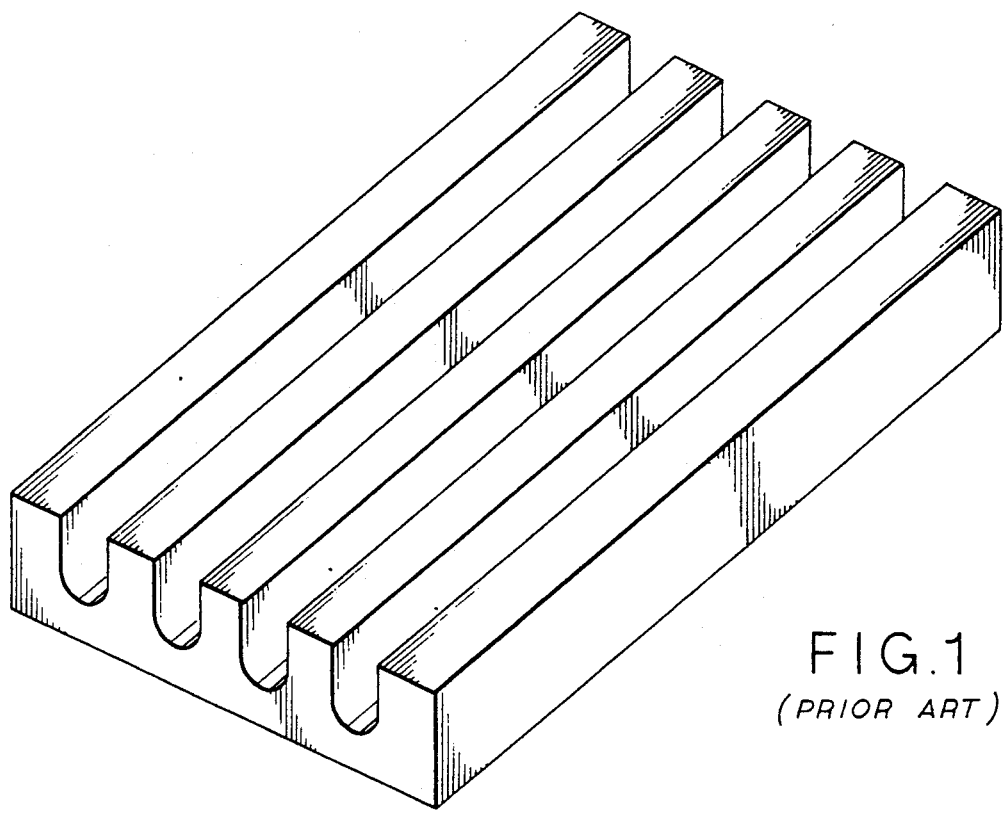
FIG. 1 is a perspective view of an audio compact disk holder which is prior art.
Figure 2:
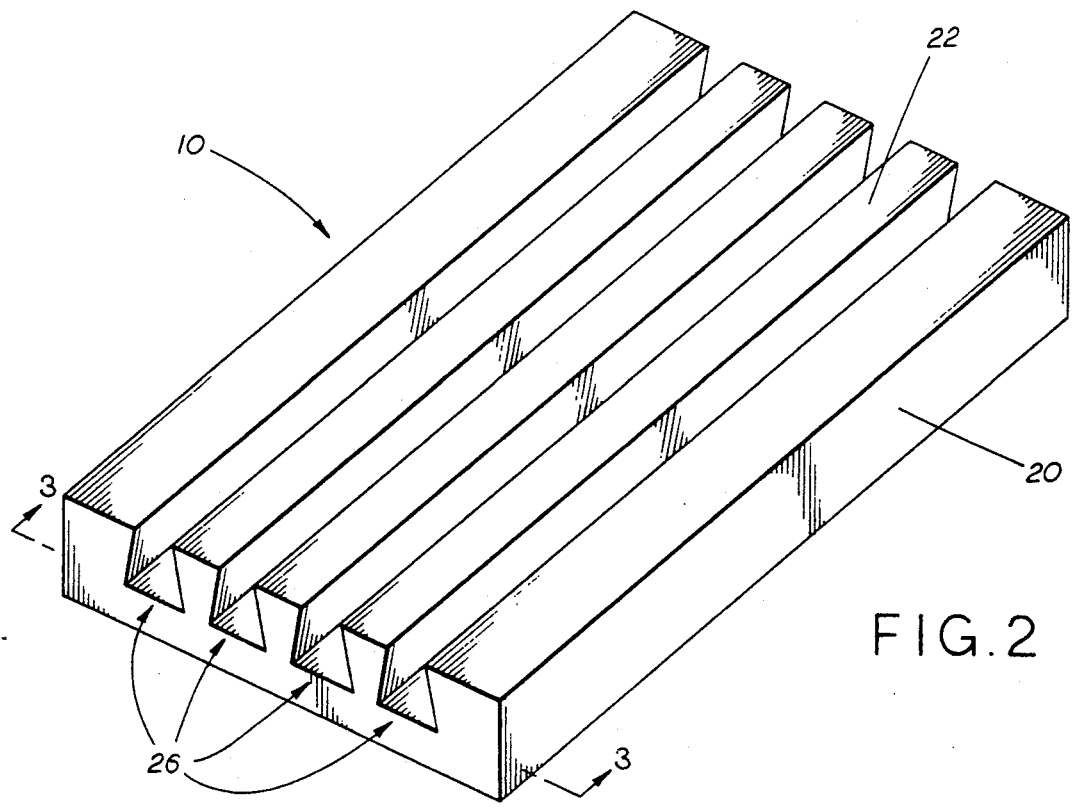
FIG. 2 is a perspective view of a disk holder according the preferred embodiment of the present invention.

Referring to FIG. 2, a disk holder according to the preferred embodiment of the present invention, designated generally as 10, is shown. The disk holder 10 comprises a block 20 which is preferably rectangular in shape, although other shapes may be used. The block 20 is preferably made of wood, although it will be appreciated that other materials such as plastic may be used. If the disk holder 10 is made from plastic it will be possible to extrude the block 20.

Figure 3:
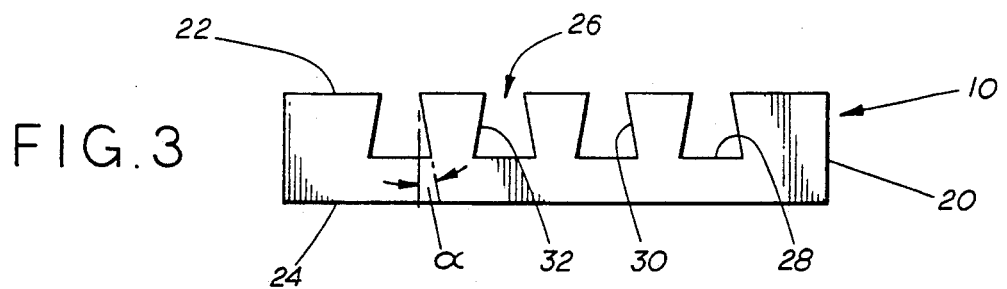
FIG. 3 is a view taken along lines 3—3 of FIG. 2.

The block 20 includes an upper substantially flat surface 22 and a lower substantially flat surface 24 as shown in FIG. 3. A plurality of dovetail grooves 26 are formed in the upper surface 22. The dovetail grooves 26 are preferably parallel to one another. The dovetail grooves 26 include a flat bottom surface 28 and two planar side walls 30 and 32 angled towards one another as they approach the upper surface 22.

FIG. 3 best illustrates the shape of the dovetail grooves 26 of the 3½ inch disk holder 10 according to the preferred embodiment. The depth of the groove 26 measured from the upper surface 22 to the groove bottom surface 28 is preferably in the range of ⅜ ths to 7/16 ths of an inch. Preferably, the depth of the groove 26 is at least ⅜ ths of an inch for reasons which will be explained below. The thickness of the block 20 is preferably a minimum of ⅝ ths of an inch if made from wood to minimize any warpage of the wood after the grooves 26 have been cut.

Figure 4:
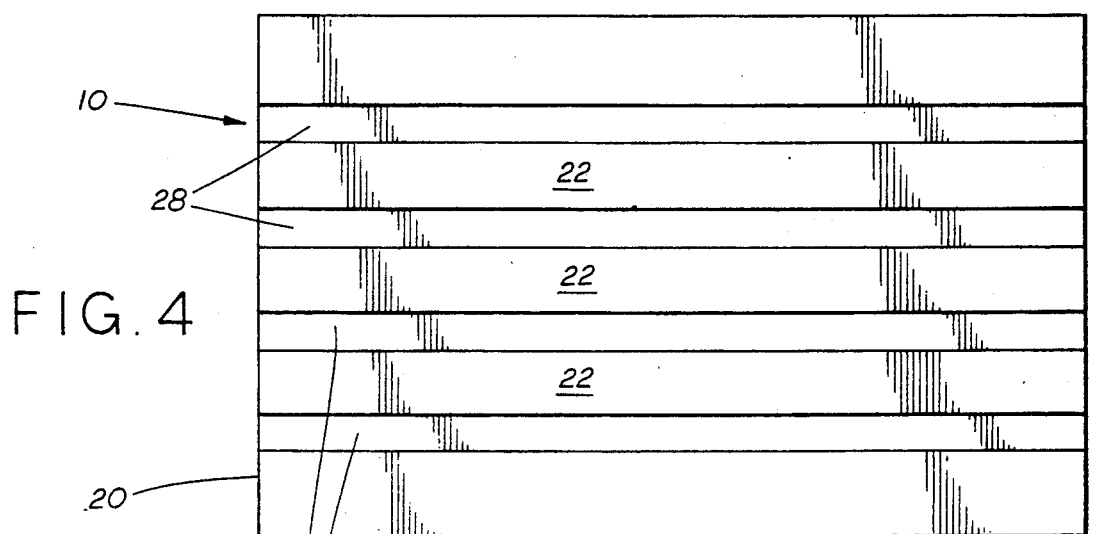
FIG. 4 is a top view of the disk holder of FIG. 2.

FIG. 4 illustrates a top view of the disk holder 10. In the preferred embodiment, the parallel grooves 26 for a 3½ inch disk holder are approximately 19/32 nds of an inch apart from centerline to centerline of the grooves 26, although other spacings may of course be used. The width of each of the grooves 26 at the upper surface 22 of the block 20 is preferably ¼ th of an inch in the preferred embodiment.

Referring to FIG. 3, the width of the groove 26 at the bottom surface 28 is approximately ⅜ ths of an inch in the preferred embodiment for a 3½ inch disk holder as will be explained below.

It has been determined that a ⅜ th inch dovetail groove made from a dovetail bit frequently used in cabinetry and woodworking will make a dovetail groove 26 suitable for the present invention.

Obviously, the number of grooves 26 and the length of the grooves 26 may be varied to accommodate as many disks as desired. For example, the disk holder 10 may have 6, 10 or even more grooves 26 and/or may have groove lengths sufficient to accommodate multiple disks in a single groove 26.

It is to be noted that the above measurements for the dovetail groove 26 are specifically for a 3½ inch disk holder 10 according to the preferred embodiment of the invention. Obviously, other measurements may be necessary for a disk holder 10 to store other types of disks.

OPERATION AND USE

Figure 5:
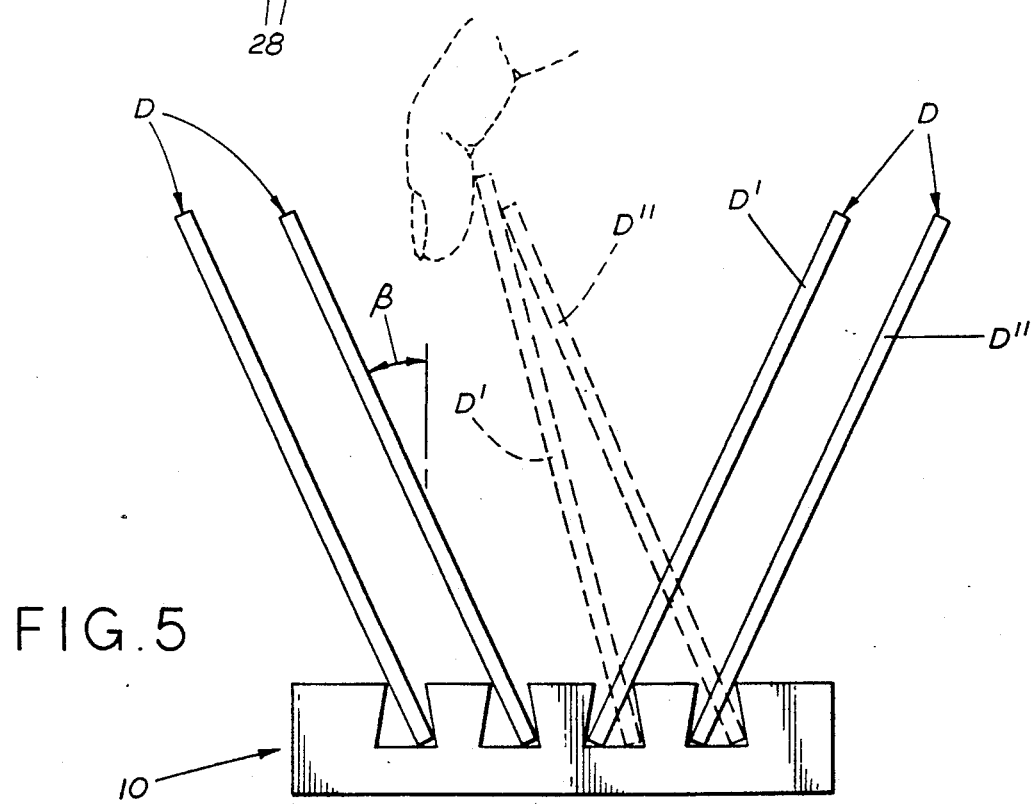
FIG. 5 is a side view of the disk holder of FIG. 2 holding disks, the dashed lines illustrating a user's finger flipping the disks from a rearward position to a forward position.

FIG. 5 illustrates the disk holder 10 according to the preferred embodiment storing 3½ inch computer disks, designated generally as D. The dovetail groove 26 as described above provides many significant and beneficial advantages in the use of the disk holder 10.

Firstly, the width of the groove at the upper surface 22 must be sufficiently greater than the width of the disk D to allow easy insertion of the lower end of the disk D into the groove 26. However, the width of the groove 26 at the upper surface 22 cannot be so much greater than the thickness of the disk D since this will adversely affect the required depth of the groove 26 and the block 20. The thickness of the 3½ inch disk is approximately ⅛ th of an inch and the preferred groove width at the upper surface is ¼ th of an inch.

Secondly, it is desirable that the disks D have at least a minimal amount of distance between each other. This will enable the user to see the identifying information, normally attached to the upper portion of the disk D, when the disk holder 10 is positioned on a work station or desk surface adjacent the computer keyboard. This information should be visible for each disk D without the necessity of having to flip through the disks. The disk holder 10 of the present invention maintains the disks D at a spacing from one another such that the identifying information can typically be seen in a "properly placed" disk holder 10 when the disks D are in the normal rearward position as shown in FIG. 5. A properly placed disk holder position will be one in which the user's line of sight will be angled at least slightly downward. The identifying information on each of the disks will not be able to be seen if improperly placed, as for example, when the disk holder is placed at user eye level or above.

As shown in FIG. 5, the disks D are stored in either one of two positions, i.e. a forward or rearward position. The disks D' and D" are shown being flipped from the rearward position to the forward position. In the preferred embodiment, the disks are stored at an angle $\beta$ with respect to vertical. The angle $\beta$ is preferably in the range of 20 to 30 degrees. The angle $\beta$ is kept to a minimum to minimize the amount of travel required in going between the forward and rearward positions. The angle $\beta$ in the preferred embodiment also enables an entire label on a disk D which is tilted away from the user to be easily and fully viewed when the disks D' and D" in front of the disk being viewed are tilted forward.

Referring still to FIG. 5, the angle $\beta$ in combination with the spacing between the grooves 26 in the present invention results in a "chain reaction" of the disks D, when for example, an intermediate disk D' is flipped from the rearward position to the forward position in a fully loaded disk holder 10. By flipping the intermediate disk D' forward, the end disk D" is forced forward also. If desired, all of the disks D can be quickly placed in the same position by flipping the end disk D" towards the opposite end disk.

The angled side walls 30 and 32 in the present invention provide a secure holding surface for the disks D. As the disks D are flipped between the two positions, the bottom end of the disk D moves from a position contacting one side wall to a position contacting the other side wall. The angle $\alpha$ (see FIG. 3) of the side walls with respect to vertical is preferably in the range of approximately 7 to 11 degrees. The angled walls 30 and 32 reduce the likelihood that the disk will be dislodged from the groove 26 when the disk is being flipped between positions.

The flat bottom 28 of the groove 26 ensures that the disks D resume either the forward or rearward position after being flipped by the user. This further ensures that the disks D remain uniformly spaced and positioned for quick and easy viewing of the identifying information on each of the disks D when in the stored rearward position.

The foregoing disclosure and description of the invention are illustrative and explanatory thereof, and various changes in the size, shape and materials, as well as in the details of the illustrated construction, may be made without departing from the spirit of the invention.

I claim:

1. A disk holder for storing a plurality of disks, comprising:
a base member having a planar upper surface and including a plurality of parallel dovetail grooves for supporting disks, each of said grooves including a generally planar bottom surface approximately parallel to said upper surface and linearly angled side walls extending from said bottom surface and converging at said upper surface.

2. The disk holder of claim 1, wherein said base member is generally rectangular in shape.

3. The disk holder of claim 1, wherein each said groove has a width at said upper surface of approximately ¼ th of an inch.

4. The disk holder of claim 1, wherein each said groove has a depth in the range of ⅜ ths to 7/16 ths of an inch.

5. The disk holder of claim 1, wherein the centerline to centerline spacing of one said groove to an adjacent said groove is in the range of 9/16 ths to ⅝ ths of an inch.

6. The disk holder of claim 1, wherein said side walls of a respective groove are at equal angles with respect to said respective groove's planar bottom surface.

7. The disk holder of claim 1, wherein one or more of said grooves has a length which allows simultaneous storage of more than one disk in said groove.

* * * * *